US011431418B2

(12) United States Patent
Rauschenbach et al.

(10) Patent No.: US 11,431,418 B2
(45) Date of Patent: Aug. 30, 2022

(54) SYSTEM AND METHOD FOR QUANTUM STATE MEASUREMENT

(71) Applicant: Notchway Solutions, LLC, Franconia, NH (US)

(72) Inventors: Kristin A. Rauschenbach, Franconia, NH (US); Katherine L. Hall, Arlington, MA (US)

(73) Assignee: Notchway Solutions, LLC, Franconia, NH (US)

( * ) Notice: Subject to any disclaimer, the term of this patent is extended or adjusted under 35 U.S.C. 154(b) by 516 days.

(21) Appl. No.: 16/498,729

(22) PCT Filed: Mar. 29, 2018

(86) PCT No.: PCT/US2018/024993
§ 371 (c)(1),
(2) Date: Sep. 27, 2019

(87) PCT Pub. No.: WO2018/183588
PCT Pub. Date: Oct. 4, 2018

(65) Prior Publication Data
US 2020/0044749 A1 Feb. 6, 2020

Related U.S. Application Data

(60) Provisional application No. 62/479,280, filed on Mar. 30, 2017.

(51) Int. Cl.
*H04B 10/00* (2013.01)
*H04B 10/70* (2013.01)
(Continued)

(52) U.S. Cl.
CPC ............ *H04B 10/70* (2013.01); *G02F 1/395* (2013.01); *G06N 10/00* (2019.01); *H04B 10/90* (2013.01); *H04L 9/0858* (2013.01)

(58) Field of Classification Search
CPC ....................................................... H04B 10/70
See application file for complete search history.

(56) References Cited

U.S. PATENT DOCUMENTS 7,457,548 B2 * 11/2008 Tomaru .................. H04B 10/70
380/255
9,030,731 B2 5/2015 Arahira
(Continued)

OTHER PUBLICATIONS

"Notification of Transmittal of the International Search Report and the Written Opinion of the International Searching Authority, or the declaration" for International Patent Application No. PCT/US2018/024993, dated Sep. 13, 2018, 20 pages, ISA/KR, Korean Intellectual Property Office, Daejeon, Republic of Korea.
(Continued)

*Primary Examiner* — Daniel G Dobson
(74) *Attorney, Agent, or Firm* — Rauschenbach Patent Law Group, LLC; Kurt Rauschenbach

(57) ABSTRACT

A quantum state measurement system includes a quantum state generator that generates an optical photon comprising a quantum state. A spectral converter modifies a spectrum of the optical photon and provides the optical photon comprising the quantum state with the modified spectrum. An optical switch switches the optical photon with the modified spectrum to one of a plurality of outputs. A measurement system determines a fidelity of the quantum state of the optical photon with the modified spectrum. A control system provides an electrical control signal to the quantum state generator in response to the determined fidelity of the quantum state that improves a fidelity of at least some subsequent generated optical photons comprising a quantum state that are generated by the quantum state generator after the optical photon.

20 Claims, 4 Drawing Sheets

(51) Int. Cl.
    *G06N 10/00*    (2022.01)
    *G02F 1/39*    (2006.01)
    *H04L 9/08*    (2006.01)
    *H04B 10/90*    (2013.01)
    *H04J 14/00*    (2006.01)

(56) References Cited

U.S. PATENT DOCUMENTS

| | | | |
|---|---|---|---|
| 2004/0109631 A1 | 6/2004 | Tomaru | |
| 2005/0133780 A1 | 6/2005 | Azuma | |
| 2009/0097862 A1* | 4/2009 | Munro | H04L 9/0855 |
| | | | 398/175 |
| 2013/0308956 A1* | 11/2013 | Meyers | B82Y 10/00 |
| | | | 977/933 |
| 2015/0354938 A1* | 12/2015 | Mower | B82Y 20/00 |
| | | | 356/450 |

OTHER PUBLICATIONS

"Notification Concerning Transmittal of International Preliminary Report on Patentability (Chapter I of the Patent Cooperation Treaty" for International Patent Application No. PCT/US2018/024993, dated Oct. 10, 2019, 17 pages, The International Bureau of WIPO, Geneva, Switzerland.

* cited by examiner

SYSTEM AND METHOD FOR QUANTUM STATE MEASUREMENT

CROSS REFERENCE TO RELATED APPLICATIONS

The present application is a 35 U.S.C. 371 application based on International Patent Application No. PCT/US2018/24993, filed on Mar. 29, 2018 entitled "System and Method for Quantum State Measurement", which claims priority to U.S. Provisional Patent Application No. 62/479,280, entitled "Towards a Flexible, Modular, Scalable Hybrid Quantum State Measurement System" filed on Mar. 30, 2017. The entire contents of International Patent Application No. PCT/US2018/24993 and U.S. Provisional Patent Application No. 62/479,280 are herein incorporated by reference.

The section headings used herein are for organizational purposes only and should not to be construed as limiting the subject matter described in the present application in any way.

INTRODUCTION

Quantum systems are increasingly demonstrating more capabilities that are useful for common information processing tasks. Quantum information processing provides a very different paradigm for the manipulation of information as compared to classical systems. Many experts in the art believe that, in general, future quantum processing systems will excel at providing rapid solutions to certain difficult problems. For example, many experts in the art believe that future quantum systems will be useful in solving and modeling various probabilistic and statistical problems, reducing complex search times, providing secure search and communication methods as well as many other applications.

Currently, it is possible to generate and distribute entangled quantum states, such as coherent states, over reasonable distances via free space or optical fiber. The electronic and optical manipulation of various atomic species, both at cold and room temperatures, can lead to a variety of quantum state emission possibilities, as well as quantum interference and quantum memory operations. As quantum-state based processing moves into practice, it is necessary to provide measurement and characterization systems that allow different quantum systems to interact. In particular, a variety of different quantum systems, which are based on different underlying quantum components and processes, will need to be characterized and measured so that they can be controlled and operate as part of a common system.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

Figure 1:
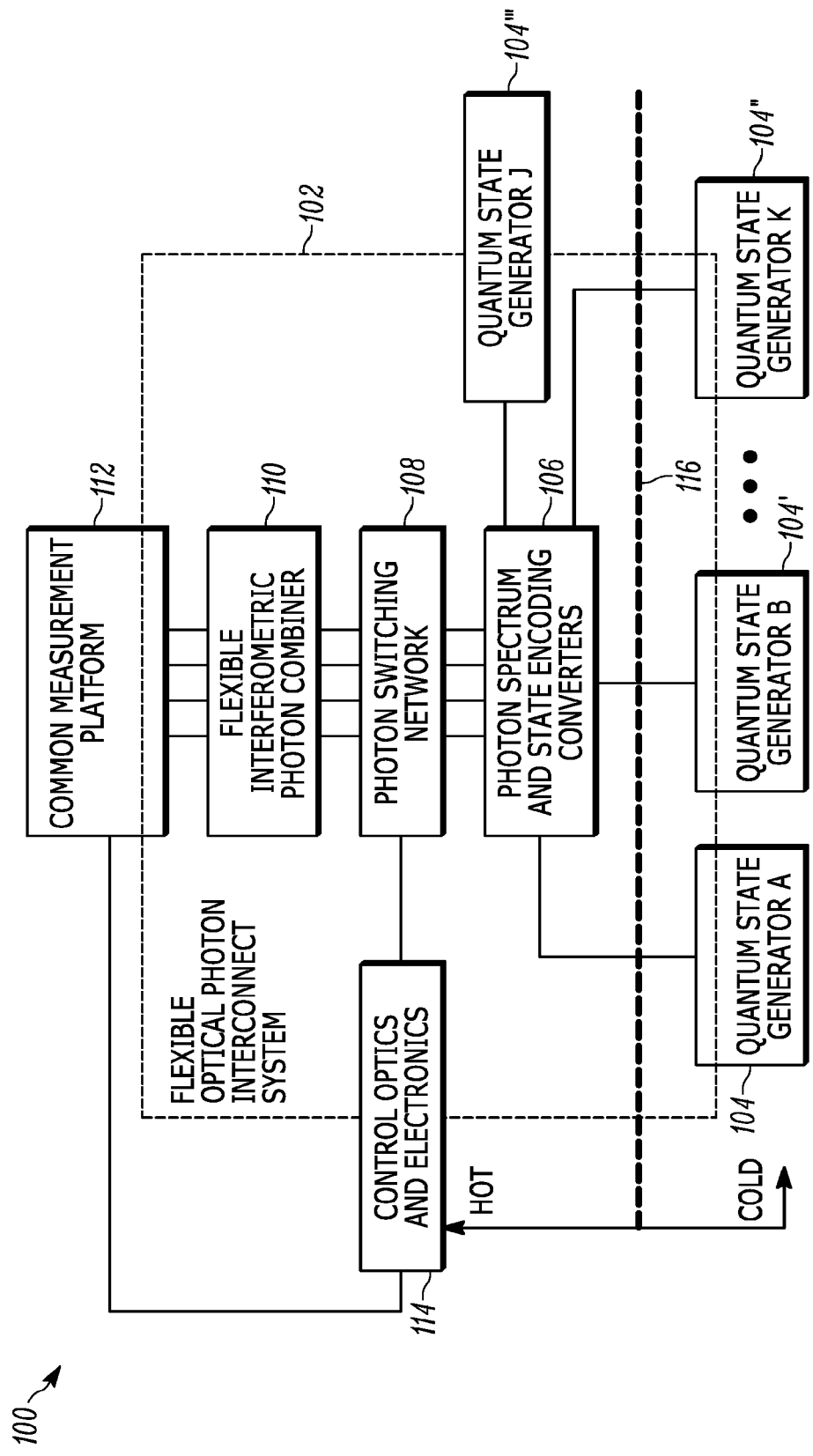
FIG. 1 illustrates a quantum measurement system that includes a flexible photon interconnect system according to the present teaching that provides the backbone for the hybrid quantum state measurement system.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments as long as the teaching remains operable.

The present teaching relates to a common measurement platform for various types of disparate qubit systems. The disparate qubits may arise from quantum systems that are different types, e.g. quantum dots and atomic systems, or from the same system in different configuration, e.g. quantum dot emitters and quantum dot logic gates. The disparate qubits can also arise from two different instantiations of the same quantum system. For example, disparate qubits can arise from two preparations of quantum dots, or two different preparations of atomic memories. These preparations can perform the same quantum operations, or different quantum operations.

Quantum operations can include, but are not limited to, single photon generation, entangled state generation, quantum logic operation, quantum memory operation, quantum gate operations, quantum teleportation, and various types of quantum measurement. Quantum operations may generate qubits, perform logic using qubits, store qubits or move qubits from one place to another.

Those skilled in the art will appreciate that although qubits are described herein as example quantum states, the methods and systems of the present teaching are widely applicable to any of the numerous types of quantum states that are carried by optical photons. As is known in the art, a photon may carry an optical qubit encoded in the form of, for example, polarization. In addition, a single photon is a quantum state in itself. And, an entangled photon pair represents a quantum state as well. Low dimension and high dimension quantum states are possible. A feature of the present teaching is to provide a measurement and control scheme and platform that is able to combine numerous types of quantum systems, and/or operations, together into a single functional system or subsystem that performs a larger or more complete quantum function. Examples of these larger or more complete quantum functions are computation, processing, sensing, communication, and state transfer.

Various embodiments of the system and method for quantum state measurement according to the present teaching uses photons to carry the quantum state, and to generate entanglement between disparate single qubits, or other more complex quantum states that are encoded onto photons with a high-degree of flexibility. Using photons to carry quantum state and to generate entanglement between disparate qubits has many uses. These uses include the ability to broaden the toolbox for quantum computer architects and to help speed the realization of complex quantum computation systems. Systems and methods for quantum state measurements according to the present teaching are useful in furthering quantum qubit and quantum gate technology as well as quantum subsystem development. For example, systems and methods for quantum state measurements according to the present teaching are useful in defining functional building blocks for quantum computer architects and contributing to the establishment of system level performance evaluations and control and management schemes for large scale quantum computers and distributed processors. The present teaching will enable system integration activities and commercial product development objectives in quantum research and commercial quantum systems deployment.

One aspect of the present teaching is to provide a flexible, modular, scalable hybrid quantum state measurement system that interconnects similar or disparate quantum state generators and entangle arbitrary qubits. Various aspects of the present teaching address some of the important system-level bridges between quantum and classical processes, optical and electronic quantum state, and cryogenic and room temperature sub-systems with an emphasis towards specific system integration and product development objectives.

A hybrid system as defined herein is a quantum system that relies on more than one quantum process or quantum state type to operate. For example, a single photon may be generated by a semiconductor-based quantum dot and need to interact with a quantum memory that comprises a different atomic element. Also, multiple quantum memories, which can be based on different underlying quantum systems, may need to exchange quantum state. As another example, a long-lived quantum memory, such as a cold-atom memory, may need to interact with a memory that has a faster response time, such as a warm-atom memory. One technical challenge is that the classical control schemes for these systems are different. Another technical challenge is that the underlying photons and encoding of the quantum state are different.

A further example is that quantum computation may take the form of simple linear operations using passive optics, e.g. beam splitters, together with qubits that are entangled using a single photon measurement technique. These qubits may emerge from similar or dissimilar quantum systems, such as quantum dots, trapped ions, or various atomic systems. In quantum computation systems performing these linear operations, classical and/or quantum measurements are required to make the exchange of quantum state possible. In addition, classical and/or quantum measurements are also required for quantum systems performing quantum-preserving optical conversions of the optical photon's spectrum.

The hybrid quantum state measurement system according to the present teaching provides at least three important benefits to the quantum art. First, the system provides the basis for a common measurement platform for disparate qubit systems, e.g. semiconductor dots and atomic systems, including production of key components. Second, the system establishes system-level designs for bridges between hot and cold systems, and classical and quantum management and control schemes. Third, the system fosters a "best in breed," modular design philosophy, establishing flexible functional blocks for quantum computer architects and distributed system designers.

The evolution of optical communications from laboratory environments through directed system-level research, to commercial development, to widespread deployment of large-scale systems provides a helpful roadmap for development of future fault-tolerant quantum computer and complex functional quantum processing systems. At a high-level, the roadmap indicates quantum computer development will require intense focus on the bridges between heterogeneous subsystems of various kinds. The present teaching is at least in part directed to these bridges between heterogeneous subsystems of various kinds.

There is no single material, platform, process or structure that alone enables the full complement of capabilities required to construct a functional quantum processor or quantum communication system. Historically, the technological development of complex systems tends to scale-up and thrive when a set of modular tools or subsystems emerges. These modular tools or subsystems are defined by boundaries that encompass technologies that can be built cost-effectively, and that can provide interfaces that support effective functional building blocks for system architects. The development of these modular tools or subsystems sometimes involves trial and error. However, progress can be hastened when research activities in material and component development are focused on system-level objectives. These system-level objectives can include scalability, controllability, and well-crafted functional segmentation. Progress can also be hastened when technologies are heavily leveraged from other fields and disciplines. The present teachings are directed at least in part assisting in the rapid development of these modular tools or subsystems.

More specifically, the present teaching relates to a common measurement platform that can be used to probe quantum states, provide system control and calibration information, and produce computation output. It is desirable for this common measurement platform to operate at room temperature. However, the present teaching does not exclude cryogenic technologies, such as superconducting nanowire detection. Room temperature operation is desirable because it allows for unlimited electronic processing. It is also desirable for this common measurement platform to convert all the incoming qubits of differing wavelengths to a common single-photon measurement wavelength. These two features assist in rapidly commoditize the measurement platform, and hasten construction of larger scale systems.

One significant design decision that must be made, preferably early in the design process, is to identify the common measurement wavelength. One aspect of the present teaching is that, in some embodiments of the system and method for quantum state measurement, the common measurement wavelength will be in a the range of 500-600 nm. The choice of wavelength range for this embodiment has several desirable features including: (1) providing cost-effective wavelength conversion from the know quantum state generator wavelengths; (2) allowing the use of a wide variety of low cost, free-space and fiber-based optics; (3) providing compatibility with silicon photonic integration; and (4) providing compatibility with broadly available and highly capable silicon Single-Photon Avalanche Diode (SPAD) photodetectors, as well as faster, superconducting nanowire detectors.

Other embodiments with other wavelength ranges will have additional features and be compatible with other kinds of detection schemes. In various embodiments of the system and method for quantum state measurement, the measurement wavelength will be in a visible wavelength band, in a telecom wavelength band, in a near IR wavelength band, or in a UV wavelength band. These bands all have particular desirable features for quantum measurement systems. For example, the visible wavelength band provides a number of good performing low cost detectors.

Near-infrared telecommunications wavelengths are often cited as desirable for quantum state measurement systems because there are numerous commercially available components that operate in the telecommunications band ~1550 nm. This wavelength range is often used for long-distance quantum communication systems because this wavelength range has a low loss window for optical fiber transmission and a relatively long photon propagation distances can be achieved. However, many of the components and subsystems that have been developed for telecommunications applications are not useful for quantum applications, including most notably the Erbium-Doped Fiber Amplifier (EDFA) as well as the lossy devices commonly used with EDFAs.

Initial large-scale quantum computers are likely to have a footprint and I/O requirements more commensurate with today's data center applications. Current fibered solutions for the data center often operate at 800 nm, not 1550 nm. The advanced, high port count, low-loss, optical switching platforms being researched for data center applications are likely not to be tethered to the telecommunications band, but to a wavelength range where low loss optical components can be reliably packaged and operated and inexpensively produced. The current trend suggests that these system requirements will be achieved using visible or near infrared components, with operating wavelengths between 500 nm and 1000 nm. Therefore, one aspect of the present teaching is the use of a common measurement wavelength in the visible portion of the spectrum, as it is believed to be an excellent choice for many embodiments of the system and method for quantum measurement according to the present teaching, especially those embodiments used for hybrid quantum computation.

The increasing presence of cryogenic (77K) filters in base stations illustrates that cold systems can be productized. However, quantum state generators will need to accommodate significant supporting electronics. Cooling these electronics creates practical issues that limit commercialization. The history of commercializing optical communications indicates that optical components need significant supporting commodity electronics to be widely deployed. For example, high-capacity optical line cards are constructed with ~10% optics and ~90% electronics on a component-count scale. These electronic components provide significant processing in order to support modulation, demodulation and control. The ratio of electronics to optics in a commercial product can be an order of magnitude higher than commonly associated with laboratory demonstration-type systems. There is little doubt the old adage often states by experienced researches in the art "warm when you can, cold when you must," should rule a scalable path to quantum computing. Another aspect of the present teaching is that various embodiments of the method and system of quantum measurement according to the present teaching advantageously use optical photons to bridge the cold and warm environments.

The quantum state generators according to the present teaching can produce optical photons that carry quantum state information in a number of different optical wavelength bands. For example, the IR wavelength band, the telecom wavelength band, the visible wavelength band, and the UV wavelength band can be used. The quantum measurement system must convert the wavelength of the photon emitted from the quantum state generator to a wavelength that is compatible with the measurement system.

One aspect of the present teaching is a flexible interconnection system. FIG. 1 illustrates a quantum measurement system 100 that includes a flexible photon interconnect system 102 that provides the backbone for a hybrid quantum state measurement system according to the present teaching. The system approach builds on previously demonstrated modular entanglement demonstrations by others in the research community. The interconnect system 102 collects optical photons carrying quantum state from various quantum state generators 104, 104', 104", 104'". These photons could represent individual single photons, single qubits or logical qubits, depending on the particular quantum state generator 104, 104', 104", 104'". The photons are converted to a common wavelength by a photon spectrum and state encoding converter 106. The ability to convert single photons to different wavelengths (colors) has been previously demonstrated, at least for some particular wavelength regimes. The converted photons are modestly processed by a photon spectrum and state encoding converter 106 to improve measurement performance and routed using a photon switching network 108 to a quantum interferometer stage 110 and are then detected in some form of common measurement component 112. The photon switching network 108, quantum interferometer stage 110, and common measurement component 112 are described in more detail below, including a discussion of a particular embodiment described in connection with FIG. 2.

The photons are converted to the common platform wavelength. In some method according to the present teaching, the photons benefit from spectral transformation and/or conversion of a modulation format. Wavelength conversion is performed in many methods in order to bring wavelengths into coincidence for improved interference detection efficiency. That is, the photon spectrum and state encoding converter 106 converts a wavelength of a photon that carries a quantum state from, for example, quantum state generator 104 to a wavelength that can be detected by the common measurement platform 112. In some embodiments, the quantum state generator 104 wavelength is around 900 nm, or between 890-1000 nm, and the common measurement platform component 112 wavelength is 450 nm, or between 400 nm and 600 nm. It should be understood that numerous other wavelength band are within the scope of the present teaching. The photon spectrum and state encoding converter 106 can also be used to convert spectral properties like bandwidth and/or chirp. In addition, some systems according to the present teaching will convert the modulation format between, for example, polarization formats and spectral formats (e.g. different frequencies) or various amplitude modulation or phase modulation formats. In some embodiments, narrow atomic memory photons (e.g. kHz) are converted to a broad-band (e.g. GHz or THz) dot spectrum or vice versa. In various embodiments, known techniques from femtosecond optics can be used for these conversions. Converting phase encoding to polarization encoding, however, can be used to produce more complex modes of entanglement and qubit encoding.

Processing for spectral matching that occurs in the photon spectrum and state encoding converter 106 has been proposed in the art, but currently has not yet been fully developed or demonstrated. Preservation of the coherent and quantum properties is paramount. There exists an engineering trade between the use of photonic processing to convert and transform spectrum versus overall measurement fidelity in the system owing to, for example, losses and other impairments and imperfections. The process of converting the spectrum of the photon will cause loss and affect the phase and/or polarization of the photon. These imperfections will also degrade the quantum state, hence resulting in reduced measurement fidelity. The output of the measurement component 112 feeds a control system 114, which in turn, manages the quantum state generators 104, 104', 104", 104''' and components within the flexible photonic interconnect 102.

The common measurement component 112 may comprise a simple Hong-Ou-Mandel measurement, a Bell state measurement and/or a full or partial tomography of the quantum state. The measurement component 112 can determine the quantum state that is carried by the photon. The measurement component 112 can, for example, perform a quantum correlation measurement. The measurement component 112 can also determine a degree of entanglement. The measurement component 112 can determine a number of optical photons. A variety of known quantum measurements can be performed by the measurement component 112 that are used, for example, to help control and/or improve the generation of quantum states, perform a processing operation, calibrate some part of the system, and/or to entangle quantum states from some or all of the quantum state generators.

The measurement component 112 can also determine a fidelity of the quantum state. This information can be used to control the quantum state generator using the controller 114. For example, if a quantum state generator is producing poor quality qubits, the controller 114 can send signals to the quantum state generator 104, 104', 104", 104''' to improve the quality of qubits or other quantum state encoded on the photon for subsequent generated photons. For example, in some embodiments, the controller 114 sends signals that change RF control signals that are used to control the quantum state generator. Either or both of the applied RF power and RF frequency may be varied. The controller 114 can also send signals that modify an optical pump power and/or frequency being used to generate optical photons in a quantum state generator 104, 104', 104", 104'''. The controller 114 can also send signals that modify an applied magnetic field being used to generate optical photons in a quantum state generator 104, 104', 104", 104'''. Many other known control signals can be used that will improve the fidelity of a quantum state from a quantum state generator based on the results of the measurement.

As is known in the art, the fidelity of a quantum state is a measure of how close one quantum state is to another quantum state. The fidelity can also be a measure of a particular quantum state to a pure mathematical definition of the expected quantum state. A quantum state can be characterized by a density matrix, and a distance between the density matrix of two states describes the relative fidelity. A Bures metric or Helstrom metric is frequently used as a measure of a distance between two quantum states. A measurement of a quantum state generally changes the state being measured as is well known in the quantum physics. Consequently, frequently quantum states are determined on ensembles of "identical" states. An unknown state can be determined by a series of measurements, for example, measurements in different bases. The more measurements, for example with full tomography is used, the better the representation of the quantum state, and hence the better the determination of the fidelity of that state relative to another state, or to the ideal mathematical state. For practical systems, a limited numbers of measurements are taken, and quantum fidelity is approximated in various known ways, depending both on the type of quantum state and the type of measurement.

Fidelity measurements for determining fidelity of quantum states are known in the art. For example, the reference: Moehring, D. L., et al. "Entanglement of Single-Atom Quantum Bits At A Distance," Nature 449.7158 (2007), 68-71, describes a fidelity measurement for quantum states emerging from two atomic memories. As another example, the reference, Hendrych, M., et al. "Simple Measurement of the Overlap and Fidelity of Quantum States," Physics Letters A, Volume 310, (2003), 95-100, describe a fidelity measurement of quantum state encoded as polarization on photons. As a third example, the reference, O. Morin, et al., "High-fidelity Single-Photon Source Based on a Type II Optical Parametric Oscillator," Opt. Lett. 37, 3738-3740 (2012), describes the measurement of the fidelity of single photons being emitted from an optical parametric oscillator configured as a single photon emitter. These and other references use various interferometer configurations and single-photon or photon number resolving detection to determine the fidelity of quantum states.

A feature of the system and method of quantum measurement according to the present teaching is that, unlike these known systems for measuring quantum state fidelity, fidelity can be determined on disparate quantum systems whose state is carried on dissimilar photons. This is because the spectral properties of the photons is changed for at least one of the dissimilar photons to make it the same, or similar to, the other photon. This increases the cross section of the measurement allowing efficient fidelity measurement and/or entanglement across disparate systems. Furthermore, the present teaching provides a flexible optical cross connect that allows the choice of which systems are measured or entangled at which time, which substantially increases the capability and flexibility of the system.

Once the fidelity of a desired quantum state is determined, it is possible to provide feedback and control to the quantum state generator 104, 104', 104", 104''' that provided the quantum state in order to improve the fidelity. A variety of known control mechanisms can be used, depending on the system. These control mechanisms will vary the parameters of various applied control fields, which may be electrical, including RF fields and other, magnetic and/or optical. For example, for an optical downcoverter used to generate single photons, a pump power or a pump frequency may be varied to improve the generation rate or fidelity of the single photons that are generated. As another example, in an atomic memory, a power, pulse shape and/or frequency of an optical excitation used to produce a desired atomic state are varied to improve fidelity. Varying a pulse shape, pulse amplitude, and/or timing of optical excitation pulses can, for example, control and improve the fidelity of some types of quantum dots. Controlling the specific pulse sequence or amplitudes of externally applied magnetic fields can control and improve the fidelity of other types of quantum dots.

In many embodiments of the quantum measurement system 100, parallel optical transport utilizing free space optics is used both within the flexible optical interconnect system 102 and as input/output from the flexible optical interconnect system 102. One feature of parallel transport is that it naturally supports moving between the cold/hot boundary 116. At the same time, the common platform wavelength that is chosen for particular embodiments to be in a range of 500-600 nm, is well suited to integrated devices using standard process silica or silicon nitride on silicon. We recognize that some subsystems within the flexible photon interconnect system 102 may eventually benefit from guided wave and photonic integration. However, photonic integration unnecessarily restricts the available piece parts available for system building blocks and may slow the commercialization of quantum systems. For example, silicon photonic integrated platforms are not amenable to cold environments due to both temperature sensitive performance and mismatched coefficients of thermal expansion. Photonic integration works most effectively when driven by cost savings in a proven market. Research on quantum Photonic Integrated Circuits (PICS) is important, but its role in the system development is not essential. A well-designed, parallelized, free-space optical system is widely deployable, as wavelength-selective switches demonstrate.

The flexible optical photonic interconnect system 102 shown in FIG. 1 can be implemented with components and methods that are well known in the optical physics and optical communication art. However, over time, the various underlying components will improve and new technologies will be introduced that improve performance and functionality. It is should be understood that the present teachings apply to these improvements and new technology.

Figure 2:
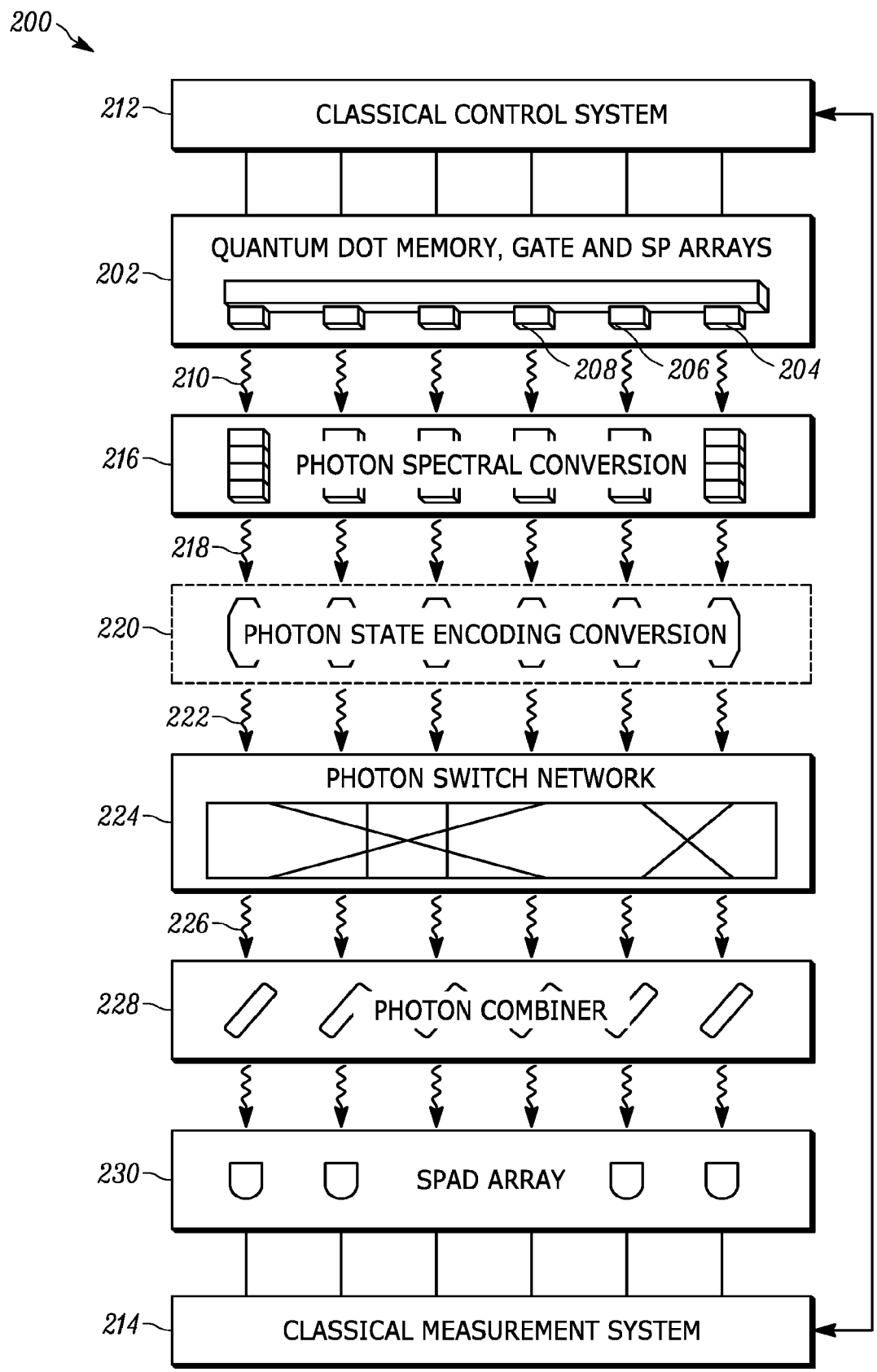
FIG. 2 illustrates a block diagram of an embodiment of a quantum measurement system according to the present teaching.

Some embodiments of the quantum state measurement system according to present teaching utilize semiconductor quantum dot quantum state generators as one or more of the quantum state generators 104, 104', 104", 104'" in the flexible photonic interconnect 102. FIG. 2 illustrates a block diagram of an embodiment of a quantum measurement system 200 according to the present teaching. A quantum dot array 202 comprises quantum dot single photon emitters 204, quantum dot gates 206, quantum dot memories 208, and/or other quantum state generators positioned on a semiconductor substrate. Regardless of the quantum function being provided, the elements in the quantum dot array 202 emit a photon 210 that carries a quantum state.

Quantum dots are solid-state devices that have numerous desirable features for quantum systems, such as being amenable to fabrication into parallel arrays, support integration of optical and electrical function. Quantum dots have been shown to operate as single photon sources, as electrically and optically controlled qubit gates, and as memories. Semiconductor quantum dots, however, suffer from fundamental wavelength variation of the emitted photon, based on particulars of material and structures. Many experts in the art believe that it is highly likely that a future quantum computer will contain some form of semiconductor quantum dot device. Quantum dot devices are incorporated in some embodiments of the common measurement platform of the present teaching.

A classical control system 212 is used to control one or more of the quantum dots in the array 202. The classical control system 212 can perform various functions, such as triggering a quantum state change, triggering an emission of a single photon, or beginning a process of initiating the random generation of quantum states and/or single photons, depending on the quantum dot array type. The classical control system 212 is electrically connected to a classical measurement system 214. In this way, the control system 212 can control the quantum dot array 202 in response to measurements of the quantum states being emitted by the quantum dot array 202. Although the classical measurement system is referred to herein as "classical", as is known in the art, the classical processing that occurs in the classical measurement system 214 may relate to the determination of some aspect of the quantum state, e.g. the presence of a particular quantum state, or the fidelity of a quantum state, the coherence of a quantum state, degree of entanglement, type of quantum state, etc., Therefore, the classical measurement system 214 might be still be considered to be part of a quantum measurement. The semantic distinction is related to the fact that processing in classical measurement system 214 occurs after the detection event in at least one detector in the detector array that collapses the quantum state encoded on the photon.

A photon 210 emitted from a quantum dot in the array 202 carries a quantum state. This quantum state can be encoded by, for example, polarization, RF frequency, optical frequency and/or amplitude or phase modulation. The photon 210 passes to a photon spectral conversion stage 216. This stage provides a spectral wavelength shift and/or a spectral broadening and/or a spectral phase and/or amplitude profile to the photon 210 that carries the quantum state. The output is a spectrally modified photon 218 that preserves the quantum state of the photon 210. In some embodiments, the photon spectral conversion stage 216 comprises nonlinear waveguides that are used to perform optical wavelength conversion. In some embodiments, the photon spectral conversion stage 216 comprises grating-type optical devices with various phase manipulation capabilities that allow for modification of the spectral profile of the photon 210. In some embodiments, the photon spectral conversion stage 216 includes a Liquid Crystal (LC) device, such as a Liquid Crystal on Silicon (LCOS), or a Micro Electro Mechanical System (MEMS) device that is used to manipulate the spectral properties of the photon 210.

The output photon 218 from the photon spectral conversion stage 216 is passed to an optional photon state encoding conversion stage 220. In some embodiments, the optional photon state encoding conversion stage 220 converts a basis of a polarization format to a new basis. The present teaching is not limited to any particular types of conversions. For example, in some embodiments, the optional photon state encoding conversion stage 220 converts different polarizations to different frequencies. Also, in some embodiments, the optional photon state encoding conversion stage 220 converts phase encoding to polarization encoding. Also, in some embodiments, the optional photon state encoding conversion stage 220 converts polarization encoding to phase encoding.

A photon 222 carrying the quantum state emerges from the photon spectral conversion stage 216 and is input to the photon switching network 224 that allows formation of various entanglement schemes and formation of logical qubits at the measurement platform. The switch 224 generally switches one or more input photons at one or more inputs to one or more output ports. The switch 224 can also offload photons to a performance monitoring system, which may or may not be part of the measurement system 214. For example, the performance monitoring system can provide calibration of either the quantum state generator, i.e. the quantum dot array 202 or the measurement system 214 or other parts of the system. In some embodiments, the performance monitoring system is part of the measurement system 214. While integrated optical cross-connects with built-in interferometric switches may be used in the switch 224, these devices tend to be low-port-count and have high loss. In some embodiments, high-port count, low loss, high-speed transparent optical cross-connects are used in the switch 224. Large port count (1000×1000) millisecond switches are widely deployed, but high-speed 50-port devices have also been demonstrated, albeit with higher loss (e.g. 9.6 dB). The main purpose of the cross connect, which supports generally any-to-any port connectivity, is to allow the quantum computer architect flexibility, and to support system calibration efforts. As such, port count and connectivity are different for different embodiments of the present teaching.

Photons from the switch 224 are input to an interferometric combiner 228 and then are detected on a detector 230. The interferometric combiner 228 can include simple beam splitters and/or polarization-based splitters. The interferometric combiner 228 can be a single stage combiner, or can include more than one stage of beam splitting and recombining. In some embodiments, the photon detector 230 is a single photon detector. In other embodiments, the photon detector 230 is a photon number resolving detector. In yet other embodiments, the photon detector 230 is an array of detectors. In one specific embodiment, the photon detector 230 is a single-photon avalanche photodiode array. Outputs from the photon detector 230 are provided to a classical measurement system 214. The classical measurement system 214 derives quantum state information from the detected photons. In some embodiments, the classical measurement system 214 performs partial or full quantum state tomography on the photons and/or the quantum state carried by the photons.

Figure 3:
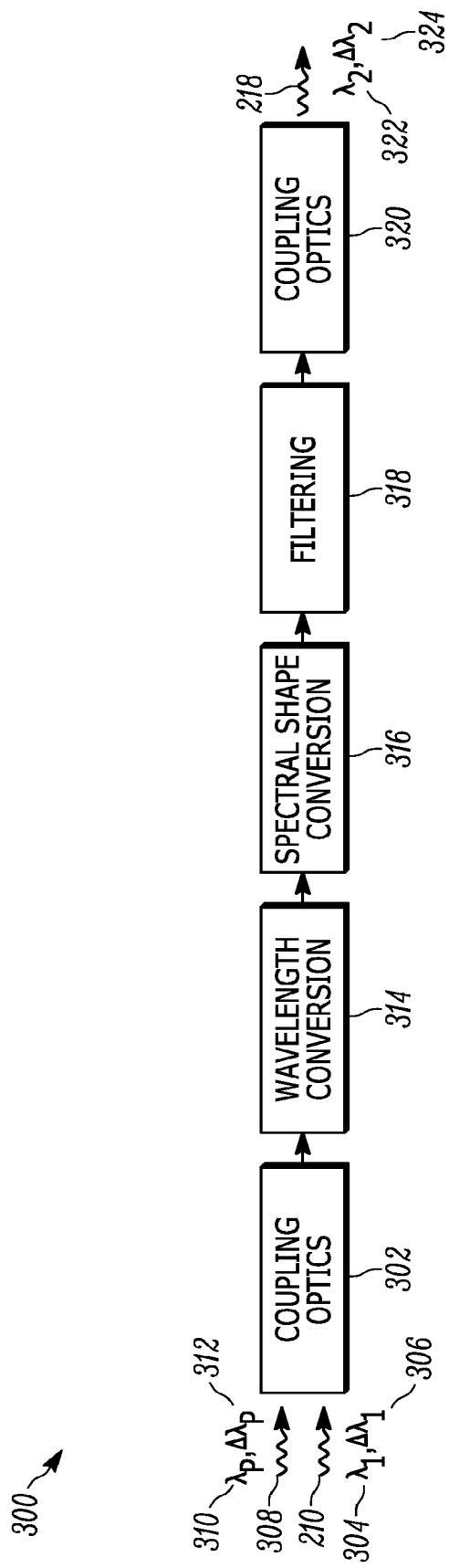
FIG. 3 illustrates a block diagram of a wavelength and spectral shape converter for single photon input and output for use in hybrid quantum systems according to the present teaching.

FIG. 3 illustrates a block diagram of a wavelength and spectral shape converter 300 for single photon input and output for use in a hybrid quantum system according to the present teaching. Referring to both FIG. 2 and FIG. 3, the photon spectral conversion stage 216 takes the input photon 210 and converts it to a new wavelength photon 218 by the wavelength and spectral shape converter 300. The input coupling optics 302 combine the photon 210 that has a wavelength 304, $\lambda_1$, and spectral width 306, $\Delta\lambda_1$, with one or more pump photons 308 that has a wavelength 310, $\lambda_p$, and spectral width 312, $\Delta\lambda_p$. The interaction of the pump photon 308 and input photon 210 in a nonlinear medium of a wavelength converter 314 converts the wavelength of the photon 210. Then, the optional spectral shape conversion 316 changes the spectral shape of the photon 210. The pump is filtered using a filter 318, and the converted photon 218 is then coupled out of the wavelength and spectral shape converter 300 using coupling optics 320. In some embodiments, the wavelength and spectral shape converter 300 is an integrated optical system. In other embodiments, the wavelength and spectral shape converter 300 is a free space optical system. In yet other embodiments, the wavelength and spectral shape converter 300 is a hybrid integrated and free space system.

Figure 4:
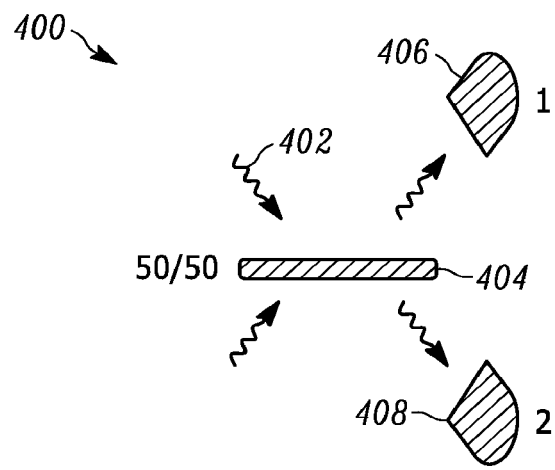
FIG. 4 illustrates a schematic view of a Hong-Ou-Mandel (HOM) interferometer stage that can be used with the quantum state measurement system according to the present teaching.

FIG. 4 illustrates a schematic view of a Hong-Ou-Mandel (HOM) interferometer stage 400 that can be used with the quantum state measurement system according to the present teaching. Referring to both FIG. 2 and FIG. 4, the combiner 228 and detector 230 may be configured to perform a Hong-Ou-Mandel measurement using a Hong-Ou-Mandel (HOM) interferometer stage 400. For these measurements, an input photon 402 impinges on a 50/50 beam splitter 404 and two detectors 406, 408 that are set to measure the reflected and transmitted signals through the beam splitter 404 are monitored for detections. The resulting detections can be passed to the classical measurement system 214 for further processing and to inform control functions.

Figure 5:
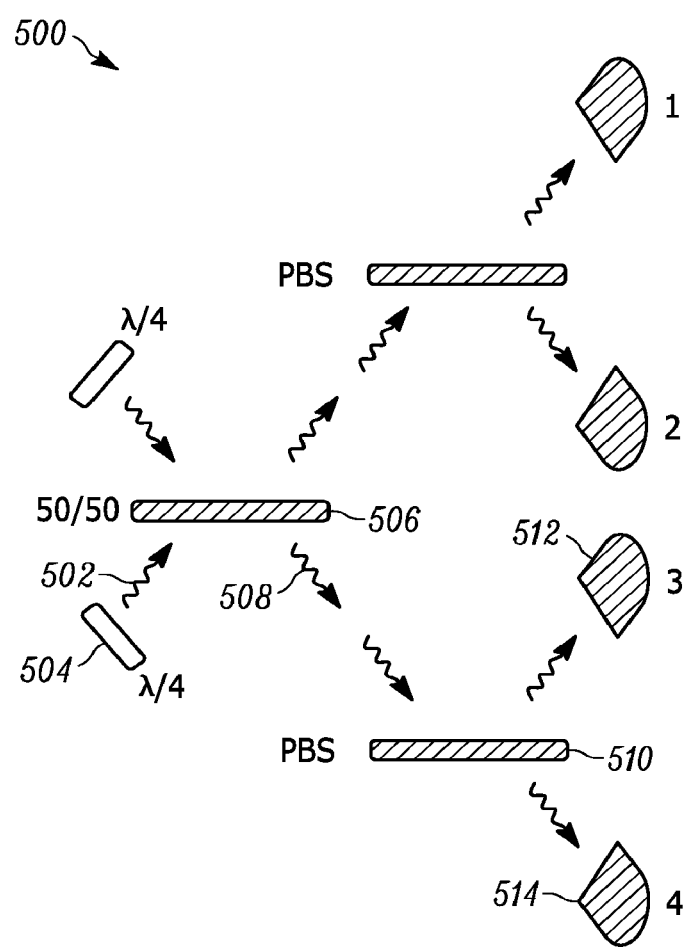
FIG. 5 illustrates a schematic view of a Bell state measurement optical front end that can be used with the quantum state measurement system according to the present teaching.

FIG. 5 illustrates a schematic view of a Bell state measurement optical front end 500 that can be used with the quantum state measurement system according to the present teaching. Referring to both FIG. 2 and FIG. 5, the combiner 228 and detector 230 may be configured to perform a Bell measurement using a Bell measurement optical front end 500. Only one side of the Bell measurement optical front end 500 is described here. It is understood that the other side is symmetrical. Single photons 502 pass through a quarter waveplate 504 and hit a 50/50 beam splitter 506. The photons 508 from the 50/50 beam splitter 506 are passed through a polarizing beam splitter 510. Two detectors 512, 514 are positioned to measure the reflected and transmitted signals through the polarizing beam splitter 510 and are used to monitor the detections. The detections from all four of the detectors shown in FIG. 5 may be passed to the classical measurement system 214 for further processing and to inform control functions.

The HOM and Bell state interferometers schematically illustrated in FIGS. 4 and 5 are nearly at a design-for-manufacture technological maturity, at least for a modular measurement system. In some embodiments of the system for quantum state measurement according to the present teaching, the detection is performed using high-speed silicon photo-multiplier (SiPM) arrays. However, it should be understood that other detection schemes can be readily accommodated by the architecture.

Another aspect of the present teaching relates to a wavelength convert/spectral shaper. As described above, efficient coherent spectral conversion of photons is critical to building scalable quantum computers/processors that take advantage of the combined strengths of a variety of different quantum systems and technologies. To date, a number of wavelength conversion techniques and processes have been demonstrated, but all are still limited by inefficient conversion efficiencies, due primarily to coupling and filtering losses. Furthermore, demonstrated state-of-the-art systems are typically large tabletop set-ups that require frequent realignment and have been custom designed to connect only a small subset of different quantum systems. Thus, there is a clear need for a quantum wavelength converter that can flexibly convert multiple input wavelengths to a common system or measurement wavelength efficiently and coherently and in a small enough package to be deployed wherever it is needed in a hybrid system.

All-optical quantum wavelength conversion was first proposed by Prem Kumar in 1990. In the many years since, experimental results have confirmed that entanglement, phase coherence and photon statistics are preserved by wavelength conversion via sum frequency generation (SFG) and difference frequency generation (DFG) in $\chi^{(2)}$ materials, such as potassium titanyl phosphate (KTP) and lithium niobate (LN). While the original wavelength conversion schemes used bulk crystals and short pulse lasers, the advent of nonlinear waveguide devices, such as periodically poled lithium niobate (PPLN) and KTP (PPKTP) has reduced the pump power requirements for efficient wavelength conversion enough to use continuous wave (CW) pump sources. This change is significant, not only because it reduces the size and complexity of the pump sources in the wavelength converter, but also because it eliminates any timing or relative phase requirements between the pump lasers and the incoming photons. These features allow a single wavelength converter device to be used for both deterministic and probabilistic quantum systems.

One technical challenge with using these more traditional waveguides is that their refractive index and waveguide dimensions are not well matched to those of optical fiber. It is often the coupling losses associated with these mismatches that are the primary loss mechanism in the conversion process. There are a number of ways to improve the mode matching between the nonlinear waveguide and the fiber including using tapers at the ends of the fiber and/or the nonlinear waveguide and using lensing elements, either formed-on or separate.

Another approach to improving the efficiency of the wavelength conversion process is to use different types of nonlinear waveguides, such as silica waveguides and photonic crystal fibers (PCFs). In addition to improved coupling efficiencies, these types of waveguides offer clearer paths to integration with other electro-optic or fiber optic components, such as beam splitters, switches and filters. Despite their promise, these Si/photonic crystal waveguides have not yet shown the same high internal conversion efficiencies and converted photon fidelities that have been demonstrated in PPLN and PPKTP nonlinear waveguide devices. However, there is a rich design space in the various parameters, such as waveguide material properties, dispersions, and dimensions that can be exploited.

In addition to wavelength conversion, efficient coherent spectral engineering may be required to optimize the combined features of different quantum systems and technologies. For example, source photons with spectral bandwidths of hundreds of GHz may interact more efficiently with optical memories with bandwidths of tens of MHz, if their spectra are modified for greater overlap. Some early experiments have demonstrated more than ten times (10×) spectral compression of single photons using similar nonlinear components to those used in wavelength converters. Other approaches are to develop customized nonlinear waveguides to demonstrate spectral engineering. One feature of the present teaching is realization that the combination of specially designed nonlinear waveguides used with controlled laser pump signals can be used to achieve wavelength conversion and spectral shaping in a signal device, as shown schematically in FIG. 3.

In some embodiments of the present teaching, pulse shaping techniques are used to generate phase and amplitude sculpted pump signals that will be used in combination with the custom designed nonlinear waveguides and exit filtering stages to yield photons with converted center wavelengths and spectral signatures. Because the system may be converting single photons with center wavelengths between 900 nm and 980 nm to single photons with center wavelengths between 550 nm and 650 nm, the pump wavelengths in our system are in the telecom range, 1200-1800 nm. One feature of the present teaching is that the pump wavelengths can be engineered to a wavelength where there are a large variety of relatively inexpensive components for signal generation, beam steering, and for wavelength and polarization manipulation available for system integration. For example, a liquid crystal based optical signal processor that can attenuate and change the phase of an optical signal in 25 picometer slices is presently commercially available, and could be used to determine pump laser requirements for different sets of interconnect performance specifications. The filter stage can include both polarization and wavelength filters. In addition, custom designs can be used to yield the more than one hundred dB extinction that is required for the pump signals, while preserving the target photon spectral shape at the output of the converter.

Some embodiments of the system for quantum state measurement according to the present teaching use simultaneous conversion of single photons from more than one input source. For example, single photons from different sources with different wavelengths can be converted to the same output wavelength by mixing them with different pump signals. The different pump signals can be generated using different pump lasers or by carving different spectral portions from a broad band pump.

One feature of the system and method for quantum state measurement according to the present teaching is that it can be used to control the quantum state provided by one or more quantum state generators. In some embodiments, the quantum state measurement systems of the present teaching control one or more quantum state generators that generate an optical photon comprising a quantum state at an output. These may be single photon emitters and/or more complex quantum state emitters, quantum memories, quantum logic gates, quantum entanglement generators or transport systems, or other types of quantum processors or emitters. The underlying quantum systems can include quantum dots, atomic systems including cold or warm ions or atoms, lattice based systems (such as NV centers and semiconductors), various metamaterials, nonlinear optical downconverters, and other optical parametric oscillator systems, as well as numerous other quantum systems that provide a quantum state on optical photons.

The photons that carry the state are sent to a spectral converter that modifies a spectrum of the optical photon. This modification can include wavelength conversion and/or modification of the phase and amplitude profile of the optical spectrum. One or more spectrally converted optical photons are input to ports of an optical switch that can flexibly connect inputs to the same or different output ports. This allows signals from different quantum state generators to be measured, independently or together, in a subsequent measurement stage. A measurement system that generally comprises a series of interferometric combiners and single photon or number resolving detectors, which are configured to provide a desired fidelity measurement or entanglement of the quantum states from one or more quantum state generators, is used to determine a fidelity of a quantum state. This output may be used to provide a particular computational outcome from the quantum state generators, or it may be used to feedback and improve the operation of a quantum generator. For example, a control system connected to the measurement system can provide an electrical control signal to the quantum state generator in response to the determined fidelity of the quantum state that improves a fidelity of at least some subsequent generated optical photons comprising a quantum state that are generated by the quantum state generator after the optical photon. This electrical control signal would, for example, control a power, pulse sequence, pulse shape, and/or other parameter of an optical, RF and/or magnetic field that is applied to the particular quantum system that operates to generate the quantum state.

Another feature of the system and method of quantum state measurement according to the present teaching is that it can provide a hybrid quantum state measurement and entanglement system that provides quantum interaction between two quantum systems while also providing control to these systems. In these systems, a first quantum state generator generates optical photons with one wavelength and/or spectral profile that is encoded with a quantum state and a second quantum state generator generates optical photons with another one wavelength and/or spectral profile and encoded with another quantum state. These spectra and states can be quite different or very similar, depending on the application. The outputs are sent to a spectral converter that converts the photons so they are similar spectrally. This may include converting them from two different wavelengths to two wavelengths that are the same, and/or changing their spectral properties so they are more similar, e.g. converting a broad spectrum to match a narrow spectrum or vice versa. Once the spectral properties of the photons that carry the encoded quantum state are made similar, they are put into a measurement system that performs a quantum measurement.

In various embodiments of the system and method for quantum state measurement according to the present teaching, the quantum measurement is used external to the system, for processing, and/or is used internal to the system for control. For example, the two similar photons carrying quantum state from the two quantum generators may be put into a measurement system comprising an interferometric combiner and single photon detectors that performs a coincidence measurement or other tomography that allows for the two quantum generators to be entangled. As a second example, photons from a single photon source generator and photons from a quantum logic generator that is processing the output of the photon source generator can be measured to ensure the integrity of the single photon source as well as the outcome of the logic operation. Entanglement can be provided by providing appropriate control signals to the quantum state generators that is based on the output of the measurement system. Or, the measurement system can provide a signal that indicates when the two quantum generators are producing a desired output, such as an entangled state.

Those skilled in the art will appreciate that the system and method for quantum state measurement according to the present teaching can be applied to benefit a variety of quantum processing systems to help extend the capability and the performance of the system. The particular examples presented herein are not intended to limit the present teaching.

EQUIVALENTS

While the Applicant's teaching are described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. A quantum state measurement system comprising:
   a) a quantum state generator that generates an optical photon comprising a quantum state at an output;
   b) a spectral converter having an input that is optically coupled to the output of the quantum state generator, the spectral converter modifying a spectrum of the optical photon and providing an optical photon comprising the quantum state with the modified spectrum at an output;
   c) an optical switch having an optical input coupled to the output of the spectral converter, the optical switch switching the optical photon with the modified spectrum to one of a plurality of outputs;
   d) a measurement system comprising a plurality of inputs, a respective one of the plurality of inputs being optically coupled to a respective one of at least some of the plurality of outputs of the optical switch, the measurement system determining a fidelity of the quantum state of the optical photon with the modified spectrum; and
   e) a control system comprising an input that is coupled to an output of the measurement system and comprising an output that is electrically connected to a control input of the quantum state generator, the control system providing an electrical control signal to the quantum state generator in response to the determined fidelity of the quantum state that improves a fidelity of at least some subsequent generated optical photons comprising a quantum state that are generated by the quantum state generator after the optical photon.

2. The quantum state measurement system of claim 1 wherein the quantum state generator comprises a quantum dot quantum state generator.

3. The quantum state measurement system of claim 1 wherein the quantum state generator comprises a single photon source.

4. The quantum state measurement system of claim 1 wherein the quantum state generator comprises an ion trap.

5. The quantum state measurement system of claim 1 wherein the spectral converter converts a wavelength of the optical photon to a different wavelength.

6. The quantum state measurement system of claim 1 wherein the spectral converter increases a bandwidth of the spectrum of the optical photon.

7. The quantum state measurement system of claim 1 wherein the spectral converter decreases a bandwidth of the spectrum of the optical photon.

8. The quantum state measurement system of claim 1 wherein the spectral converter provides a wavelength chirp across the spectrum of the optical photon.

9. The quantum state measurement system of claim 1 wherein the optical switch comprises a cross-connecting switch.

10. The quantum state measurement system of claim 1 wherein the measurement device comprises a Hong-Ou-Mandel (HOM) measurement device.

11. The quantum state measurement system of claim 1 wherein the measurement device comprises a Bell state measurement device.

12. The quantum state measurement system of claim 1 wherein the control system generates the electrical control signal such that a pump power is varied to improve the fidelity of at least some subsequent generated optical photons.

13. The quantum state measurement system of claim 1 wherein the control system generates the electrical control signal such that a pump frequency is varied to improve the fidelity of at least some subsequent generated optical photons.

14. The quantum state measurement system of claim 1 wherein the control system generates the electrical control signal such that an applied RF field power is varied to improve the fidelity of at least some subsequent generated optical photons.

15. The quantum state measurement system of claim 1 wherein the control system generates the electrical control signal such that an applied RF field frequency is varied to improve the fidelity of at least some subsequent generated optical photons.

16. The quantum state measurement system of claim 1 wherein the control system generates the electrical control signal such that an applied magnetic field power is varied to improve the fidelity of at least some subsequent generated optical photons.

17. A method of measuring a quantum state, the method comprising:
   a) generating an optical photon comprising a quantum state using a quantum state generator;
   b) modifying a spectrum of the optical photon to generate an optical photon comprising the quantum state with the modified spectrum;
   c) optically switching the optical photon with the modified spectrum to one of a plurality of optical paths;
   d) determining a fidelity of the quantum state of the optical photon with the modified spectrum; and
   e) improving a fidelity of at least some subsequent generated optical photons comprising a quantum state that are generated by the quantum state generator after the optical photon in response to the determined fidelity.

18. A hybrid quantum state measurement system comprising:
   a) a first quantum state generator that generates a first optical photon having a first wavelength comprising a quantum state at an output;
   b) a second quantum state generator that generates a second optical photon having a second wavelength comprising a quantum state at an output;
   c) a spectral converter having a first input optically coupled to the output of the first quantum state generator and a second input optically coupled to the output of the second quantum state generator, the spectral converter converting the first optical photon at the first wavelength to a third wavelength at a first output and converting the second optical photon at the second wavelength to the third wavelength at a second output; and
   d) a measurement system having a first input optically coupled to the first output of the spectral converter and having a second input optically coupled to the second output of the spectral converter, the measurement system performing a quantum measurement on the first and second optical photon.

19. The hybrid quantum state measurement system of claim 18 wherein the first quantum state generator is configured to generate the first optical photon with a first wavelength comprising a visible wavelength and the second quantum state generator is configured to generate the second optical photon having a second wavelength comprising an IR wavelength.

20. The hybrid quantum state measurement system of claim 18 further comprising an optical switch optically coupled between an output of the spectral converter and an input to the measurement system.

* * * * *